(12) United States Patent
Peters

(10) Patent No.: US 11,796,388 B2
(45) Date of Patent: Oct. 24, 2023

(54) MOUNTING ASSEMBLY FOR A PRESSURE VESSEL IN A MOBILE INSTRUMENT

(71) Applicant: Hitachi High-Tech Analytical Science GmbH, Uedem (DE)

(72) Inventor: André Peters, Kleve-Warbeyen (DE)

(73) Assignee: Hitachi High-Tech Analytical Science GmbH, Uedem (DE)

( * ) Notice: Subject to any disclaimer, the term of this patent is extended or adjusted under 35 U.S.C. 154(b) by 43 days.

(21) Appl. No.: 17/698,154

(22) Filed: Mar. 18, 2022

(65) Prior Publication Data
US 2022/0299364 A1     Sep. 22, 2022

(30) Foreign Application Priority Data
Mar. 18, 2021  (EP) ..................... 21163405

(51) Int. Cl.
*B62B 3/02*  (2006.01)
*G01J 3/02*  (2006.01)
(Continued)

(52) U.S. Cl.
CPC .............. *G01J 3/0291* (2013.01); *B62B 3/02* (2013.01); *B62B 3/04* (2013.01); *B62B 3/104* (2013.01);
(Continued)

(58) Field of Classification Search
CPC ........ G01J 3/0291; G01J 3/0264; G01J 3/443; B62B 3/02; B62B 3/04; B62B 3/104
(Continued)

(56) References Cited

U.S. PATENT DOCUMENTS 4,753,445 A  *  6/1988  Ferrare ................... B62B 1/264
                                                    280/47.131
5,078,415 A  *  1/1992  Goral .................... F17C 13/085
                                                    414/537
(Continued)

FOREIGN PATENT DOCUMENTS

| CN | 206587130 U | 10/2017 |
| DE | 8911298 U1 | 11/1990 |
| DE | 202015102466 U1 | 8/2016 |

OTHER PUBLICATIONS

European Search Report dated Aug. 31, 2021, issued in U.S. Appl. No. 21/163,405, 2 pages.
(Continued)

*Primary Examiner* — Todd M Epps
(74) *Attorney, Agent, or Firm* — Meunier Carlin & Curfman LLC

(57) ABSTRACT

Disclosed is a mobile instrument assembly comprising: a housing for accommodating one or more components of an instrument; one or more wheels for mobility of the instrument assembly; and a mounting assembly comprising: a support plate that is moveable with respect to the housing between retracted position and one or more extracted positions and that comprises, in its distal end, a pair of protrusions projecting from a surface of the support plate, wherein in the retracted position the support plate is substantially unexposed from the housing, and in each of the one or more extracted positions the support plate extends from the housing to respective extent such that perimeter of the housing and the pair of protrusions define a circular area of respective predefined diameter to allow for mounting a pressure vessel of corresponding size on the support plate between the perimeter of the housing and the pair of protrusions.

13 Claims, 3 Drawing Sheets

(51) Int. Cl.
*B62B 3/04* (2006.01)
*B62B 3/10* (2006.01)
*G01J 3/443* (2006.01)

(52) U.S. Cl.
CPC .............. *G01J 3/0264* (2013.01); *G01J 3/443* (2013.01); *B62B 2202/022* (2013.01)

(58) Field of Classification Search
USPC ........................................................ 248/129
See application file for complete search history.

(56) References Cited

U.S. PATENT DOCUMENTS

| | | | | |
|---|---|---|---|---|
| 5,095,736 | A * | 3/1992 | Fesler | B62B 3/104 |
| | | | | 73/49.3 |
| 5,131,670 | A * | 7/1992 | Clements | F17C 13/085 |
| | | | | 280/79.5 |
| 7,384,050 | B2 * | 6/2008 | Blum | F17C 13/085 |
| | | | | 280/79.5 |
| 10,266,193 | B2 * | 4/2019 | Birsen | B62B 1/002 |
| 11,300,249 | B2 * | 4/2022 | Pareek | B62B 5/0414 |
| 2017/0240193 | A1 * | 8/2017 | McNall | B62B 3/04 |

OTHER PUBLICATIONS

Belec, "Belec Compact Port HLC (Hybrid Low Carbon) World's only Portable Hybrid-Spectrometer for Perfect Carbon Analysis in Comibination with Maximum Flexibility and Latest 6GSO-Sytesm", May 1, 2020, 4 pages.

Allowance Notification dated Feb. 23, 2023, by the EPO in corresponding EP patent application No. 21163405.0, 5 pages.

* cited by examiner

MOUNTING ASSEMBLY FOR A PRESSURE VESSEL IN A MOBILE INSTRUMENT

PRIORITY

This application claims priority of European Patent application number 21163405.0, filed on Mar. 18, 2021, the contents of which is incorporated herein by reference.

TECHNICAL FIELD

The example and non-limiting embodiments of the present invention relate to a mounting assembly for a pressure vessel in a mobile instrument.

BACKGROUND

Analyzer instruments that are applicable for analysis of material such as metals at high accuracy typically rely on optical emission spectroscopy (OES) techniques such as spark OES or laser-induced breakdown spectroscopy (LIBS). Instruments that rely on OES technique(s) find use in laboratories as well as in industry where accurate and reliable material analysis is important. Especially in industrial use cases the measurements are carried out in factory premises or in field conditions of other kind, which calls for mobile analyzer instruments that can be conveniently brought to the site of measurement. On the other hand, e.g. analyzer instruments that provide high-performance analysis that relies on spark OES are typically complex apparatuses that come in sizes that are less than convenient to carry around and mobility is typically provided by providing the analyzer instrument with one or more wheels or by mounting the analyzer instrument on a wheeled trolley that is tailored for transporting the analyzer instrument.

Such a wheeled analyzer instrument is typically designed to be as small as possible to ensure maximal maneuverability in field conditions such as factory premises while still accommodating all components necessary for operation of the analyzer instrument. In this regard, however, the analyzer instrument may enable multiple modes of operation while some components that are necessary for a certain mode of operation may be redundant for other modes of operation. Consequently, maneuverability of the wheeled analyzer instrument may benefit from a mounting assembly that enables mounting such a non-integral component of the analyzer instrument thereto only when needed while keeping the dimensions of the analyzer instrument as small as possible when the non-integral component is not needed. Moreover, such non-integral components of the analyzer instrument may come in different shapes and/or sizes and hence a mounting assembly that enables mounting components of different shape and/or size may be beneficial to ensure applicability of the transport trolley independently of the shape and/or size of such non-integral components.

In context of a wheeled analyzer instrument capable of OES, an example of such a non-integral component is a pressure vessel for storing inert gas (e.g. argon) applied to shield an area of plasma generation in a spark mode while the inert gas, and hence the pressure vessel, is not needed in an arc mode. Moreover, such pressure vessels are available in different volumes and, consequently, in different sizes with respect to their height and/or with respect to the diameter of their cross-section.

Similar considerations with respect to accommodating a pressure vessel are applicable also to wheeled instruments other than OES-capable analyzer instruments, such as mobile welding equipment or trolleys applicable for mounting and transporting the welding equipment.

SUMMARY

It is an object of the present invention to provide a mobile instrument assembly that enables mounting a pressure vessel applicable for storing pressurized gas to a mobile instrument such as an OES instrument or mobile welding equipment in a manner that facilitates agile maneuverability of the instrument assembly.

According to an example embodiment, a mobile instrument assembly is provided, the mobile instrument assembly comprising: a housing for accommodating one or more components of an instrument; one or more wheels for mobility of the instrument assembly; and a mounting assembly comprising: a support plate that is moveable with respect to the housing between a retracted position and one or more extracted positions and that comprises, in its distal end, a pair of protrusions projecting from a surface of the support plate, wherein in the retracted position the support plate is substantially unexposed from the housing, and wherein in each of the one or more extracted positions the support plate extends from the housing to a respective extent such that a perimeter of the housing and the pair of protrusions define a circular area of a respective predefined diameter to allow for mounting a pressure vessel of a corresponding size on the support plate between the perimeter of the housing and the pair of protrusions.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates a mobile instrument assembly according to an example.

DESCRIPTION OF SOME EMBODIMENTS

Figure 1:
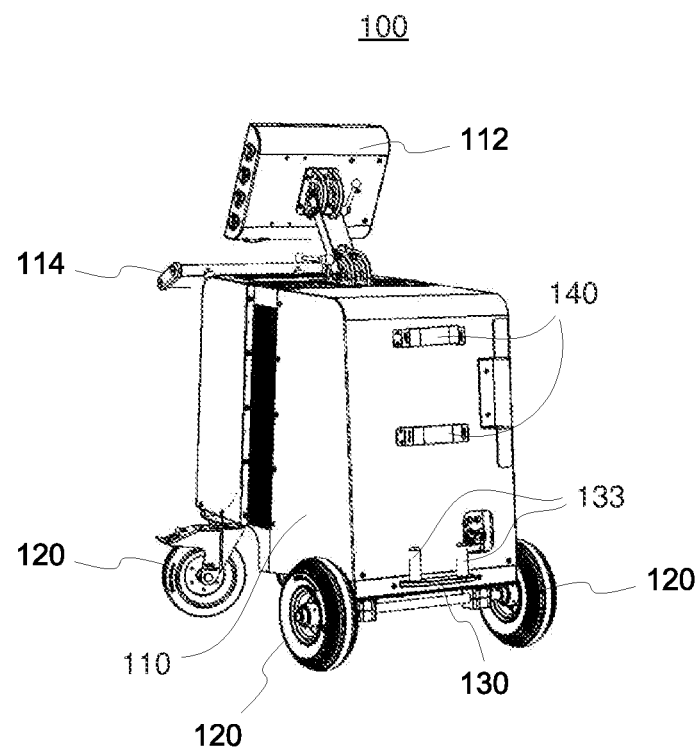
Figure 2:
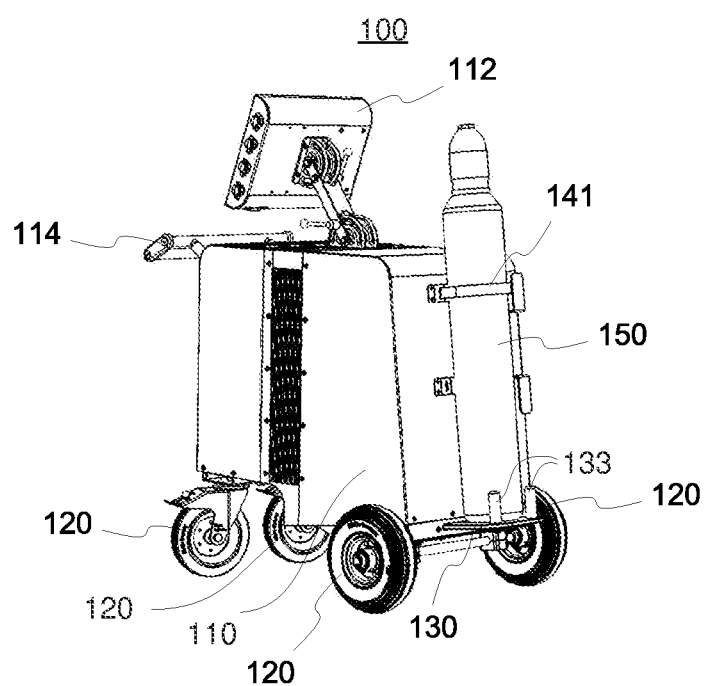
FIG. 2 schematically illustrates a mobile instrument assembly according to an example.

FIGS. 1 and 2 schematically illustrate a mobile optical emission spectroscopy (OES) instrument assembly 100 according to an example. The mobile OES instrument assembly 100 includes a housing 110 that is provided with one or more wheels 120 to enable mobility of the OES instrument assembly 100. The housing 110 serves to accommodate one or more components of an OES instrument and the housing 110 may further comprise e.g. storage space for accessories and/or materials that may be applicable for operating the OES instrument. The OES instrument may enable analysis of elemental composition of a sample using a plurality of OES techniques, including at least a spark mode (i.e. spark OES) and an arc mode (i.e. arc OES).

FIGS. 1 and 2 also show further components of the mobile OES instrument assembly 100, e.g. a display apparatus 112 for displaying measurement results to a user and a handlebar 114 for an operator of the mobile OES assembly moving the OES instrument assembly 100.

The mobile OES instrument assembly 100 further comprises a mounting assembly 130 for supporting a pressure vessel 150. In the example of FIGS. 1 and 2 the mounting assembly 130 is arranged in the housing 110, whereas other examples in this regard are described later in this disclosure. An exterior of the housing 110 may be further provided with a securing arrangement 140 that is positioned with respect to the mounting assembly 130 such that it enables securing the pressure vessel 150 positioned on the mounting assembly 130 to the mobile OES instrument assembly 100. As an example in this regard, the securing arrangement 140 may comprise a strap loop arrangement that enables securing the pressure vessel 150 to the housing 110 using one or more straps 141.

The pressure vessel 150 may be applicable for storing inert gas, such as argon, required in the spark mode for shielding an area of plasma generation on a surface of the sample under measurement from ambient air (and from oxygen in particular), thereby facilitating enhanced plasma formation and brightness on the surface of the sample. In contrast, in the arc mode the measurement is carried out in air and therefore there is no need for the inert gas. Consequently, operation in the spark mode requires availability of the inert gas and hence calls for the pressure vessel 150 mounted to the mobile OES instrument assembly 100, whereas in the arc mode the pressure vessel 150 is unnecessary and does not need to be carried along with the mobile OES instrument assembly 100.

The mounting assembly 130 is intended for supporting a pressure vessel 150 having a substantially cylindrical overall shape and, consequently, a substantially circular bottom. In the following, for clarity and brevity of description, we refer to the diameter of the substantially circular bottom of the pressure vessel 150 simply as a diameter of the pressure vessel 150. Pressure vessels 150 are available in various sizes, where dimensions of the pressure vessel 150 may depend on the volume of the pressure vessel 150, e.g. such that a higher volume of the pressure vessel 150 typically implies a larger diameter of the pressure vessel 150. Moreover, even though pressure vessels 150 of a certain volume that are locally available (e.g. in a certain country or in a certain continent) typically have practically fixed dimensions also with respect to their diameter, there are no global standards for dimensions and/or volumes of the pressure vessels 150 but e.g. respective dimensions of the pressure vessels 150 typically applied in Europe and in North America, including their respective diameters, are different from each other even if their volumes are substantially similar. Therefore, the mounting assembly 130 may have a structure that enables accommodating pressure vessels 150 having a certain predefined diameter or it may have a structure that enables accommodating pressure vessels 150 of at least two different predefined diameters.

Figure 3:
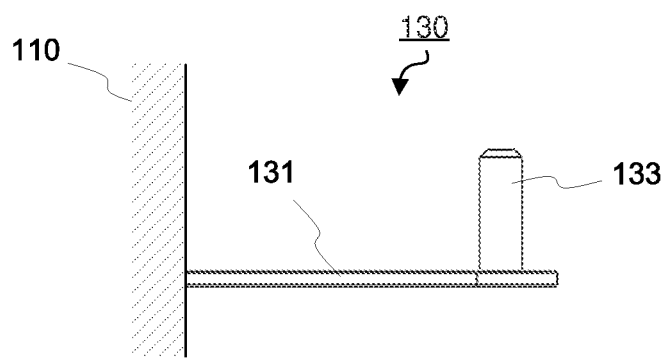
FIG. 3 schematically illustrates the mounting assembly according to an example.

FIG. 3 schematically illustrates the mounting assembly 130 according to an example, where the mounting assembly 130 comprises a support plate 131 moveably coupled to the housing 110. In this regard, the support plate 131 is moveable with respect to the housing 110 such that it may be either exposed or unexposed therefrom. When exposed from the housing 110 (as in the illustration of FIG. 3), the support plate 131 protrudes therefrom and it may serve as a mounting platform for supporting the pressure vessel 150, whereas when there is no need for mounting the pressure vessel 150 to the mobile OES instrument assembly 100, the support plate 131 may be kept unexposed from the housing 110. The support plate 131 may be considered to have a proximal end and a distal end: the proximal end is the end of the support plate 131 that remains close(r) to the housing 110 when the support plate 131 protrudes therefrom whereas the distal end is the opposite end of the support plate 131, i.e. the one that is further away from the housing 110 when the support plate 131 is extracted therefrom.

The support plate 131 may comprise a pair of protrusions 133 projecting from the surface of the mounting plate 131. The pair of protrusions 133 may be arranged at or close to the distal end of the support plate 131 and they facilitate keeping the pressure vessel 150, when mounted on the support plate 131, firmly in its position. The moveability of the support plate 131 with respect to the housing 110 may involve moveability between a retracted position and one or more extracted positions, where in the retracted position the support plate 131 is substantially unexposed from the housing 110 and where in each of the one or more extracted positions the support plate 131 extends from the housing 110 to a respective extent such that a perimeter of the housing 110 and the pair of protrusions 133 define a circular area of a respective predefined diameter to allow for mounting a pressure vessel 150 of a corresponding size on the support plate 131 between the perimeter of the housing 110 and the pair of protrusions 133.

As an example in this regard, there may be a single extracted position, where the support plate 131 extends from the housing 110 by a distance that results in the perimeter of the housing 110 and the pair of protrusions 133 defining a circular area having a diameter that corresponds to the diameter of the pressure vessel 150 having a size intended for use with the mobile OES instrument assembly 100. Such an arrangement of the support assembly 130 allows for prompting usage of a pressure vessel 150 of intended size.

In another example, there may be two or more extracted positions, where in each of the two or more extracted positions the support plate 131 extends from the housing 110 by the respective distance that results in the perimeter of the housing 110 and the pair of protrusions 133 defining a circular area having a respective diameter that corresponds to the diameter of the pressure vessel 150 of respective size intended for use with the mobile OES instrument assembly 100. Such an arrangement of the support assembly 130 allows for accounting for pressure vessels 150 of different size that are useable with mobile OES assembly 100.

The respective diameters of the circular area defined by the perimeter of the housing 110 and the pair of protrusions 133 in the one or more extracted positions of the support plate 131 may be selected such that they correspond to respective predefined diameters of pressure vessels 150 chosen from the range from 120 mm to 250 mm. As non-limiting examples in this regard, the respective pressure vessel diameters corresponding to the one or more extracted positions of the support plate 131 may comprise one or more of the following: 140 mm, 171 mm, 184 mm, 203 mm, 229 mm, 230 mm.

Figure 4:
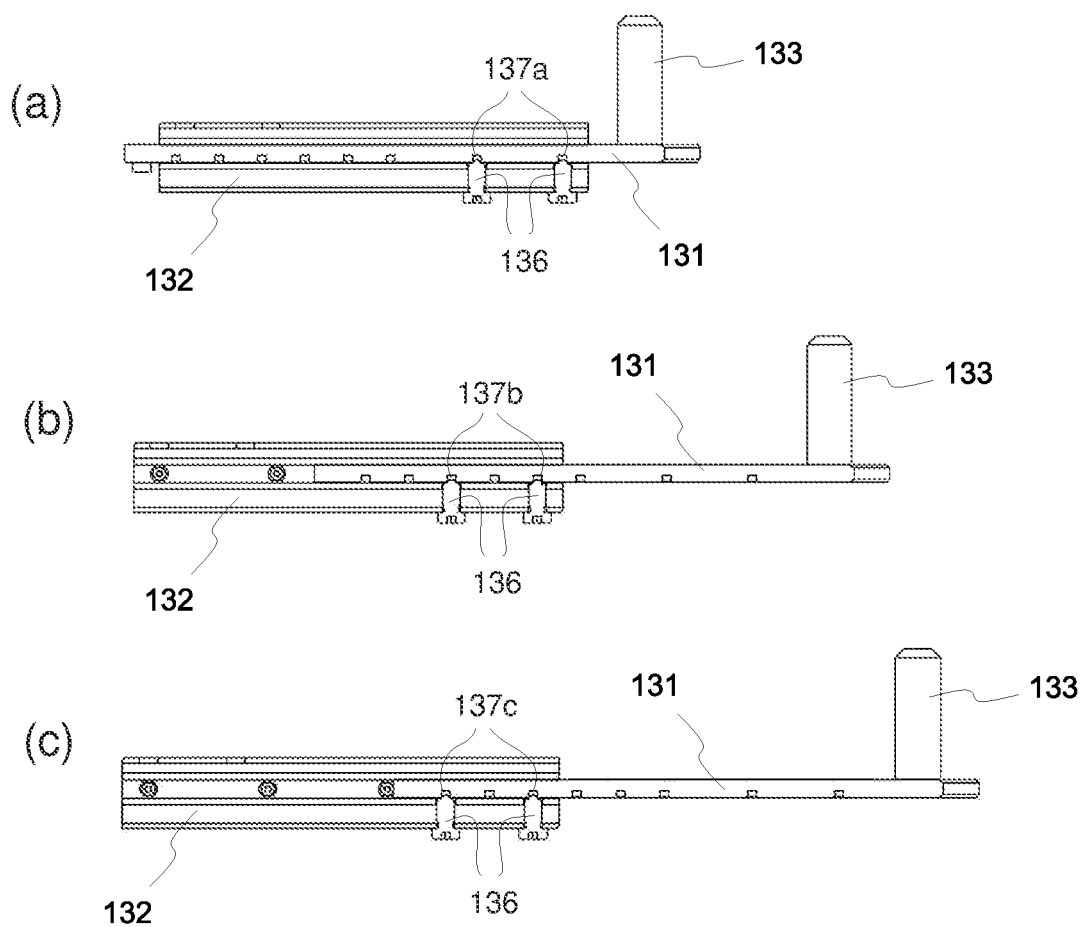
FIG. 4 *a-c* schematically illustrates movement of a support plate with respect to a pair of rails according to an example.

The support plate 131 may be coupled to the housing 110 via a pair of rails 132 mounted to the housing 110 and the support plate 131 is moveable with respect to the housing 110 along the rails 132. In this regard, the support plate 131 may be arranged between the rails 132 such that the rails 132 moveably engage the sides of the support plate 131 and guide the movement of the support plate 131 with respect to the housing 110. FIG. 4 *a-c* schematically illustrates movement of the support plate 131 with respect to the rails 132 via a non-limiting example: the illustration (a) depicts the support plate 131 in the retracted position, the illustration (b) depicts the support plate 131 in a first extracted position, and the illustration (c) depicts the support plate 131 in a second extracted position. Along the lines described in the foregoing, in other examples there may be only a single extracted position or there may be more than two extracted positions.

The rails 132 may be provided with a locking mechanism that enables locking the support plate 132 in the retracted position or in one of the one or more extracted positions. According to an example, the locking mechanism may involve one or more spring-loaded arrester pins 136 arranged in each of the rails 132 and respective one or more cuts 137*a*, 137*b*, 137*c* arranged on the sides of the support plate 131. In another example, only one of the rails 132 may be provided with one or more spring-loaded arrester pins 136 and the respective one or more cuts 137*a*, 137*b*, 137*c* may be arranged only on the respective side of the support plate 131. In this regard, at least one of the sides of the support plate 131 may include respective one or more cuts 137*a*, 137*b*, 137*c* in positions that are spatially aligned with the one or more arrester pins 136 arranged in the respective one of the rails 132 when the support plate 131 is brought to the retracted position or to one of the one or more extracted positions. Consequently, when the support plate 131 is brought to the respective position with respect to the rails 132, the arrester pins 136 engage the respective one or more cuts 137*a*, 137*b*, 137*c* on the side(s) of the support plate 131, thereby locking the support plate 131 in the respective position. This is schematically illustrated in FIG. 4 as follows: the illustration (a) depicts the support plate 131 is in the retracted position, wherein the arrester pins 136 engage the cuts 137*a* spatially aligned therewith when the support plate 131 is in the retracted position, the illustration (b) depicts the support plate 131 is in the first extracted position, wherein the arrester pins 136 engage the cuts 137*b* spatially aligned therewith when the support plate 131 is in the first extracted position, and the illustration (c) depicts the support plate 131 is in the second extracted position, wherein the arrester pins 136 engage the cuts 137*c* spatially aligned therewith when the support plate 131 is in the second extracted position.

The movement of the support plate 131 may be limited such that it cannot be moved beyond the retracted position and the one or more extracted positions. This may imply, for example, that the support plate 131 may not be moveable towards the housing further than the retracted position and/or that the support plate 131 may not be moveable further away from the housing 110 than a fully extracted position, where the fully extracted position is the one of the one or more extracted positions that corresponds to the largest one of the predefined diameters of the pressure vessels 150 the support plate 131 is able to accommodate. This may be accomplished, for example, by providing the structure of the rails 132 with a track or groove that receives a yoke arranged at or close to the proximal end of the support plate 131, where in the track or groove allows for movement of the support plate 131 between the retracted position and the fully extracted position but that does not allow for movement of the support plate 131 beyond the retracted position and/or beyond the fully extracted position.

The support plate 131 may be made of steel, for example hard-nickel-plated steel or galvanized steel (such as ST37 or similar). The rails 132 may be made of durable material such as polyvinyl chloride (PVC), polyoxymethylene (POM), polyether ether ketone (PEEK), Teflon or nylon to allow for smooth moveability of the support plate 131 with respect to the rails 132. In order to further facilitate smooth movement of the support plate 131, the coupling between the support plate 131 and the rails 132 may involve, in each of the rails 132, respective one or more adjustable (e.g. threaded) spring-loaded pressure pieces that enable adjusting the fit between the support plate 131 and the rails 132.

Figure 5:
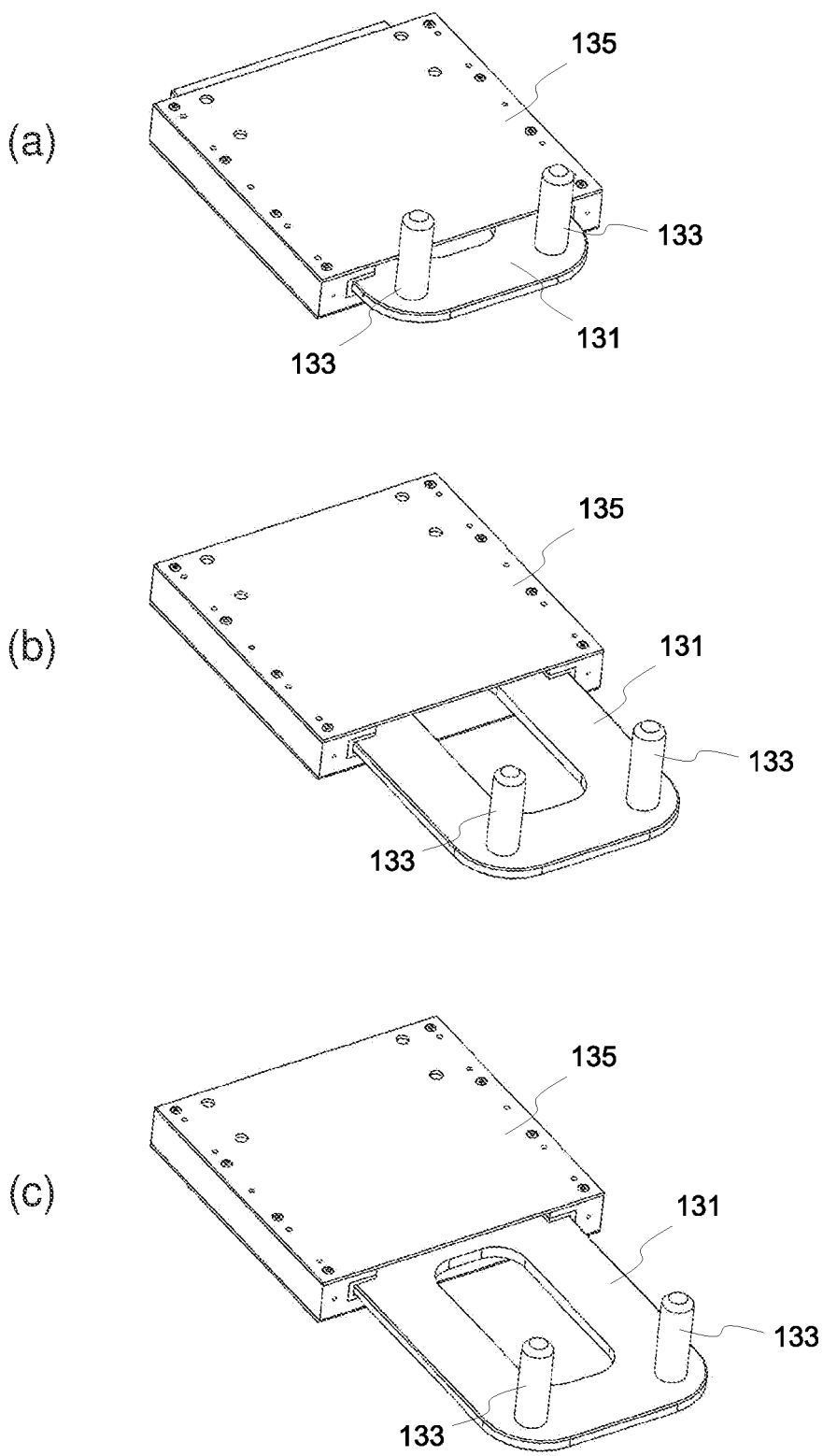
FIG. 5 *a-c* schematically illustrates movement of a support plate with respect to an installation case according to an example.

In an example, the rails 132 may be mounted at the bottom of the housing 110 and, consequently, when in the retracted position, the support plate 131 may be substantially retracted in a space under the housing 110. In another example, the rails 132 may be mounted in sides of a recess arranged in the housing 110 and, consequently, when in the retracted position, the support plate 131 may be substantially disposed within the recess. Regardless of mounting the rails 132 to the bottom of the housing 110 or to the recess therein, the rails 132 may be provided as part of an installation case 135 that may at least partially enclose the support plate 131 when arranged in the retracted position while in the one or more extracted position the support plate 131 may at least partially protrude from the installation case 135. FIG. 5 *a-c* schematically illustrates an example in this regard: the illustration (a) depicts the support plate 131 in the retracted position with respect to the installation case 135, the illustration (b) depicts the support plate 131 in the first extracted position with respect to the installation case 135, and the illustration (c) depicts the support plate 131 in the second extracted position with respect to the installation case 135. The installation case 135 may be mounted to the housing 110 such that its front end (or front side) is substantially on level with the perimeter of the housing 110.

The pair of protrusions 133 may comprise a pair of pins projecting upwards from the support plate 131. According to an example, the pair of pins may comprise a pair of rods having a substantially circular cross-section projecting from the support plate 131 (as in the non-limiting examples schematically illustrated through FIGS. 1 to 5), whereas in other examples the cross-section of the rods may have a shape different from a circular one, e.g. rectangular, hexagonal, etc. In further examples, the pair of pins may comprise a pair of substantially flat pins projecting from the support plate 131. In such an arrangement, according to an example, the flat pins may be foldable against the support plate 131 (e.g. in respective cavities arranged on the surface of the support plate 131) when the support plate 131 is in the retracted position. In a further example, the pair of protrusions may comprise respective ends of curved or folded (e.g. substantially v-shaped) holding plate arranged at the distal end of the support plate 131 substantially perpendicular to the support plate 131 with is curved or folded portion extending away from the housing. In such an arrangement the curvature or the folding of the holding plate is such that the holding plate does not interfere with the circular area defined by the perimeter of the housing 110 and the pair of protrusions 133 in any of the one or more extracted positions of the support plate 131.

In the example of FIGS. 1 and 2 the housing 110 serves as a body of the OES instrument assembly 100 and hence the one or more wheels 120 may be directly mounted at the bottom of the housing 110. In an alternative design, the housing 110 may be mounted on a frame while the one or more wheels 120 are arranged at the bottom of the frame. As an example in this regard, the rails 132 may be mounted at the bottom of the frame or into sides of a recess arranged in the frame, either directly or as part of the installation case 135.

In the example of FIGS. 1 and 2 the wheeled OES instrument 100 assembly is provided with four wheels. This, however, constitutes a non-limiting example and in other examples the number of wheels may be one, two, three or even more than four, depending on the size of the OES instrument assembly 100 and/or on desired maneuverability of the OES instrument assembly 100.

While the examples provided in the foregoing describe the mounting assembly 130 provided in the mobile OES instrument assembly 100. This is, however, a non-limiting illustrative example and in other examples the mounting assembly may be provided in a mobile instrument assembly of other kind. As an example in this regard, the one or more components accommodated in the housing 110 may be those of a welding instrument and, consequently, the mobile instrument assembly may serve as mobile welding instrument assembly.

The invention claimed is:

1. A mobile instrument assembly comprising:
   a housing for accommodating one or more components of an instrument; one or more wheels for mobility of the instrument assembly; and a mounting assembly comprising:
   a support plate that is moveable with respect to the housing between a retracted position and one or more extracted positions and that comprises, in a distal end, a pair of protrusions projecting from a surface of the support plate,
   wherein in the retracted position the support plate is substantially unexposed from the housing, and
   wherein in each of the one or more extracted positions the support plate extends from the housing to a respective extent such that a perimeter of the housing and the pair of protrusions define a circular area of a respective predefined diameter to allow for mounting a pressure vessel of a corresponding size on the support plate between the perimeter of the housing and the pair of protrusions, the pressure vessel being applicable for storing pressurized gas required by said instrument.

2. The mobile instrument assembly according to claim 1, wherein the support plate is moveable with respect to the housing between the retracted position and two or more extracted positions.

3. The mobile instrument assembly according to claim 1, wherein the respective predefined diameters corresponding to the one or more extracted positions of the mounting plate are respective predefined values selected from a range from 120 to 250 millimeters.

4. The mobile instrument assembly according to claim 1, wherein the pair of protrusions comprises a pair of pins projecting from the support plate.

5. The mobile instrument assembly according to claim 4, wherein the pair of pins are foldable against the support plate when the support plate is in the retracted position.

6. The mobile instrument assembly according to claim 1, wherein the pair of protrusions comprises respective ends of a curved or folded holding plate arranged at the distal end of the support plate substantially perpendicular to the support plate such that its curved or folded part extends away from the housing.

7. The mobile instrument assembly according to claim 1, wherein said instrument comprises an optical emission spectroscopy, OES, instrument.

8. The mobile instrument assembly according to claim 1, further comprising a pair of rails mounted to the mobile instrument assembly, wherein the support plate is moveable with respect to the housing along the pair of rails.

9. The mobile instrument assembly according to claim 8, wherein the pair of rails is arranged in one of the following:
   at the bottom of the housing,
   in a recess arranged in the housing.

10. The mobile instrument assembly according to claim 8, further comprising a frame, wherein said one or more wheels are arranged at the bottom of the frame and the housing is mounted on the frame, and wherein the pair of rails is arranged in one of the following:
    at the bottom of the frame,
    in a recess arranged in the frame.

11. The mobile instrument assembly according to claim 8, wherein at least one of the rails is provided with a locking mechanism that enables locking the support plate in the retracted position or in one of the one or more extracted positions.

12. The mobile instrument assembly according to claim 11, wherein said locking mechanism comprises, in the at least one of the rails, one or more spring-loaded arrester pins that engage respective one or more cuts arranged in a respective side of the support plate when the support plate is brought to the respective position with respect to the pair of rails.

13. The mobile instrument assembly according to claim 12, wherein the OES instrument enables operation at least in a spark mode and in an arc mode.

* * * * *